United States Patent
Kasai

(10) Patent No.: US 7,403,645 B2
(45) Date of Patent: Jul. 22, 2008

(54) MEDICAL IMAGE PROCESSING APPARATUS

(75) Inventor: Satoshi Kasai, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 674 days.

(21) Appl. No.: 10/943,945

(22) Filed: Sep. 20, 2004

(65) Prior Publication Data

US 2005/0069184 A1 Mar. 31, 2005

(30) Foreign Application Priority Data

Sep. 26, 2003 (JP) .............................. 2003-335521

(51) Int. Cl.
*G06K 9/00* (2006.01)
(52) U.S. Cl. ..................... 382/128; 382/274; 378/28
(58) Field of Classification Search ............... 382/128, 382/129, 130, 131, 132, 133, 168, 172, 181, 382/189, 203, 232, 255, 256, 274, 275, 276, 382/291, 305, 154, 209, 167, 219, 260, 285, 382/294, 318; 600/425, 411, 130, 407; 378/37, 378/8, 28, 65; 375/240.16
See application file for complete search history.

(56) References Cited

U.S. PATENT DOCUMENTS

| | | | | |
|---|---|---|---|---|
| 5,807,256 A | * | 9/1998 | Taguchi et al. | 600/425 |
| 6,934,409 B2 | * | 8/2005 | Ohara | 382/132 |
| 7,162,061 B1 | * | 1/2007 | Takeo | 382/128 |
| 7,194,123 B2 | * | 3/2007 | Takeo et al. | 382/132 |
| 7,242,794 B2 | * | 7/2007 | Imamura et al. | 382/128 |
| 7,242,795 B2 | * | 7/2007 | Takeo et al. | 382/132 |

* cited by examiner

*Primary Examiner*—Seyed Azarian
(74) *Attorney, Agent, or Firm*—Finnegan, Henderson, Farabow, Garrett & Dunner, LLP

(57) ABSTRACT

A medical image processing apparatus includes: an abnormal shadow candidate detecting section for detecting a plurality of types of abnormal shadow candidates in a medical image; and a correcting section for correcting a detection result of one type of abnormal shadow candidate by the abnormal shadow candidate detecting section based on a detection result of another type of abnormal shadow candidate.

4 Claims, 7 Drawing Sheets

A   B   C

MEDICAL IMAGE PROCESSING APPARATUS

BACKGROUND OF THE INVENTION

1. Field of the Invention

The invention relates to a medical image processing apparatus for detecting a candidate region of abnormal shadow by doing the image analysis on a medical image.

2. Description of Related Art

In a medical field, there is an occasion where a doctor interprets a medical image such as an X-ray image, an ultrasound image or the like, to find a lesion or to observe a course of a medical condition. So far, for the purpose of reducing burdens on doctor's interpretation of a medical image, the medical image processing apparatus called Computed-Aided Diagnosis (hereinafter, referred to as a CAD) which automatically detects shadow of a lesion as an abnormal shadow candidate by doing the image analysis on image data of the medical image is developed.

For the above-described CAD, a variety of algorithms are developed according to a type of abnormal shadow. For example, as a cancerous part of breast cancer, a type of abnormal shadow includes mass shadow, clustered-microcalcification shadow and the like. As an optimum algorithm for detecting mass shadow, a method using the Iris filter is suggested (see JP-Tokukaihei-10-91758A), and as an optimum algorithm for detecting clustered-microcalcification shadow, a method using the morphology filter is suggested.

Further, according to a type of shadow to be a detection target, CAD that is capable of selecting a detection algorithm of an abnormal shadow candidate is also developed (see JP-Tokukai-2002-112986A). In this case, as shown in FIG. 8, a detection is performed by each detection algorithm corresponding to a type of abnormal shadow, respectively.

However, if different types of shadow are overlapped in an image, for example, clustered-microcalcification shadow exists within mass shadow, since clustered-microcalcification shadow within mass shadow has little absorption difference of X rays compared to the case that the shadow exists in shadow of normal tissue such as a fat region or a mammary gland region, its contrast becomes extremely low. Further, in a region where different types of abnormal shadow are overlapped, quantum noise increases because the reached amount of X rays is low.

As descried above, although the contrast and the amount of noise in a region where different types of shadow are overlapped are different from these of the other regions, conventionally the detection of an abnormal shadow candidate is performed in all the image regions under the same detection condition. Therefore, abnormal shadow can not be distinguished within a region where different types of shadow are overlapped. As a result, the detection accuracy of an abnormal shadow candidate is low. Particularly, since the signal variance characteristic of noise and that of clustered-microcalcification resemble to each other, it is difficult to distinguish between the two, and there is a possibility of detecting a noise region by mistake.

SUMMARY OF THE INVENTION

An object of the present invention is to distinguish abnormal shadow to be a detection target from other types of shadow and to improve the detection accuracy of an abnormal shadow candidate.

In order to solve the above problems, in accordance with a first aspect of the invention, a medical image processing apparatus comprises: an abnormal shadow candidate detecting section for detecting a plurality of types of abnormal shadow candidates in a medical image; and a correcting section for correcting a detection result of one type of abnormal shadow candidate by the abnormal shadow candidate detecting section based on a detection result of another type of abnormal shadow candidate.

Preferably, the correcting section corrects a detection condition for the one type of abnormal shadow candidate based on the detection result of the another type of abnormal shadow candidate, and the abnormal shadow candidate detecting section performs a detection of the one type of abnormal shadow candidate in an image region in which the another type of abnormal shadow candidate is detected, by applying the detection condition corrected by the correcting section.

According to the above-mentioned apparatus, based on a detection result of an abnormal shadow candidate of a first type, a detection result is corrected by correcting a detection condition for an abnormal shadow of a second type. Therefore, within an area where an abnormal shadow candidate of the first type is detected, a detection of an abnormal shadow candidate of the second type is performed by correcting a detection condition according to the area. Therefore, it is possible to do the detection appropriately. As a result, it is possible to distinguish an abnormal shadow to be a detection target from another type of shadow, and thereby it is possible to improve the detection accuracy.

Preferably, the abnormal shadow candidate detecting section calculates each type of feature value by performing image analysis on the medical image, and detects the abnormal shadow candidate based on the feature value, and the correcting section adjusts correcting amount regarding the detection result of the one type of abnormal shadow candidate in accordance with the feature value of the another type of abnormal shadow candidate, which is calculated by the abnormal shadow candidate detecting section.

According to the above-mentioned apparatus, it is possible to adjust correction amount of a detection result of an abnormal shadow candidate of a second type according to a feature of an abnormal shadow candidate of a first type. Therefore, it is possible to do the correction in more detail.

Preferably, the medical image comprises a mammography, the abnormal shadow candidate detecting section detects a mass shadow candidate and a clustered-microcalcification shadow candidate in the mammography, the correcting section corrects a detection condition for the clustered-microcalcification shadow candidate based on a detection result of the mass shadow candidate by the abnormal shadow candidate detecting section, and the abnormal shadow candidate detecting section detects the clustered-microcalcification shadow candidate in an image region of the mass shadow candidate by applying the clustered-microcalcification shadow candidate detection condition corrected by the correcting section.

According to the above-mentioned apparatus, in a mammography, within a region where a mass shadow candidate is detected, a clustered-microcalcification shadow candidate is detected under a corrected detection condition. Therefore, if clustered-microcalcification shadow exists within a low-density mass shadow candidate region, with a detection rate increased, for example by correcting a detection condition regarding a contrast, for making it easier to detect the clustered-microcalcification shadow, it is possible to do the detection under an appropriate detection condition corresponding to the mass shadow candidate region so as to distinguish a clustered-microcalcification shadow candidate from mass shadow. Consequently, it is possible to improve the detection accuracy.

Preferably, the medical image processing apparatus further comprises a displaying section for displaying the detection result of at least one of the plurality of types of abnormal shadow candidates by the abnormal shadow candidate detecting section.

According to the above-mentioned apparatus, since a detection result of an abnormal shadow candidate is displayed, it is possible to confirm the detection result immediately.

Preferably, the display section displays the detection result so that a display of the detection result corrected by the correcting section and a display of the detection result which is not yet corrected by the correcting section are switchable.

According to the above-mentioned apparatus, a detection result is displayed so that the display of a detection result is switchable between before the correction and after the correction. Therefore, it is possible to confirm a detection result which is before the correction, according to necessity.

BRIEF DESCRIPTION OF THE DRAWINGS

The present invention will become more fully understood from the detailed description shown hereinafter and the accompanying drawing, and thus are not intended as a definition of the limits of the present invention, and wherein.

PREFERRED EMBODIMENTS OF THE INVENTION

Hereinafter, an embodiment of the present invention will be described with reference to figures.

In the present embodiment, the following example will be described: a detection of a mass shadow candidate or a clustered-microcalcification shadow is performed in an X-ray image in which a mamma of a patient is generated or radiographed (such image is called mammography) according to the finding of breast cancer. Then, in a region where a mass shadow candidate is detected, the detection of clustered-microcalcification shadow is performed under a corrected detection condition for a clustered-microcalcification shadow candidate, for correcting a detection result of a clustered-microcalcification shadow candidate. Here, in the present embodiment, the description will be made with a mammography used as an object. However, the present invention can be applied to a case of detecting abnormal shadow candidates of various types within a medical image of another type, such as an ultrasound image, an MRI (Magnetic Resonance Imaging) image or the like.

First, a structure of the present embodiment will be described.

Figure 1:
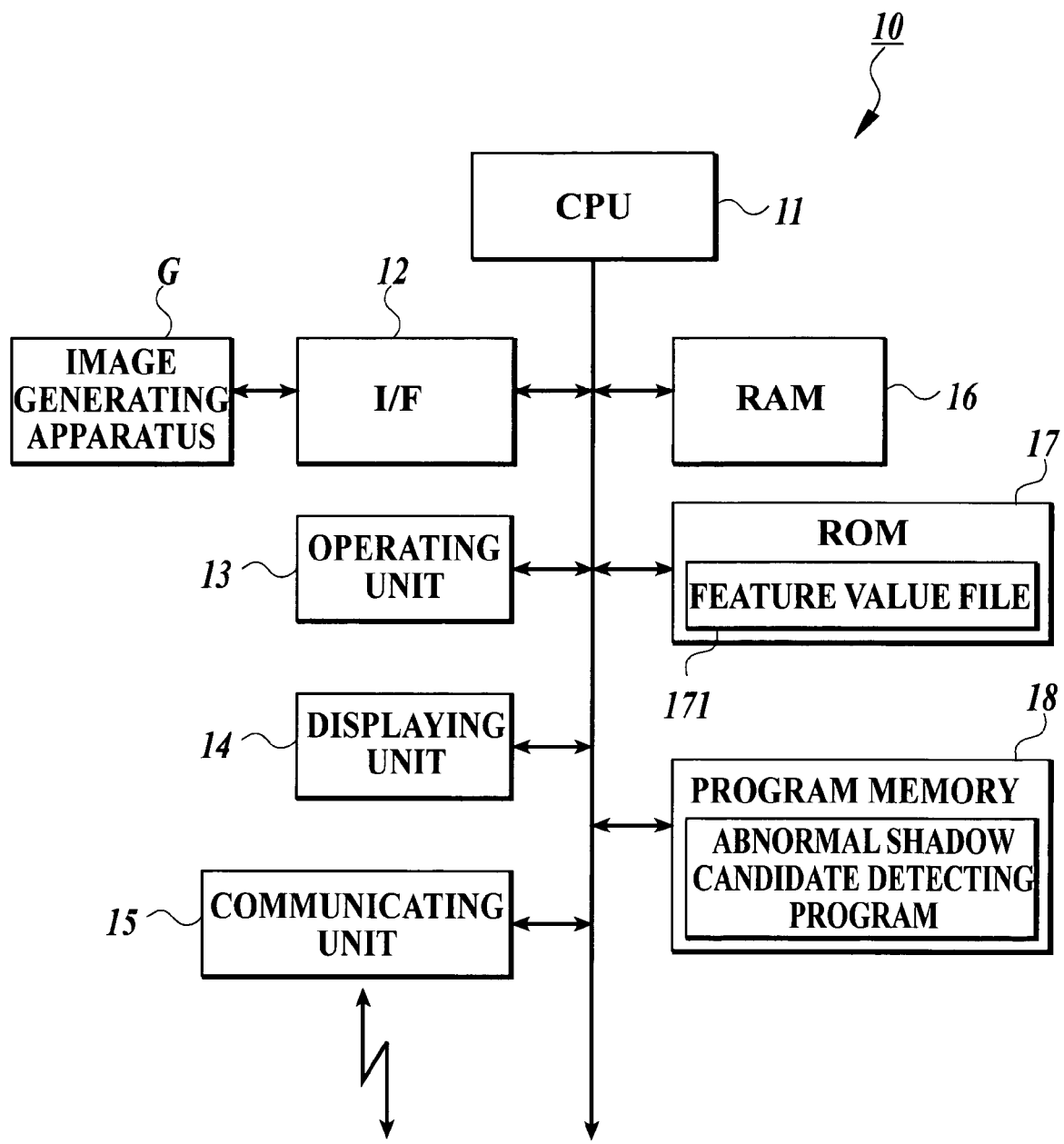
FIG. 1 is a view showing an internal structure of a medical image processing apparatus in the embodiment.

FIG. 1 shows an internal structure of a medical image processing apparatus 10 in the present embodiment.

As shown in FIG. 1, the medical image processing apparatus 10 comprises a CPU (Central Processing Unit) 11, an I/F (InterFace) 12, an operating unit 13, a displaying unit 14, a communicating unit 15, a RAM (Random Access Memory) 16, a ROM (Read Only Memory) 17 and a program memory 18.

The CPU 11 develops a system program stored in the program memory 18 into the RAM 16, and centrally controls operations of each part of the medical image processing apparatus 10 in conjunction with the program.

Further, the CPU 11 reads out an abnormal shadow candidate detecting program corresponding to a type of abnormal shadow to be a detection target from the program memory 18, and performs the detection of an abnormal shadow candidate in conjunction with the program. During the detection of an abnormal shadow candidate, a first detection which identifies a candidate region and a second detection which judges whether the identified candidate region is true positive abnormal shadow or not are performed. Then, a conclusive detection result is outputted.

Hereafter, a method for detecting an abnormal shadow candidate (a mass shadow candidate, a clustered-microcalcification candidate or the like) in a mammography will be described.

First, a method for detecting a mass shadow candidate will be described.

Mass shadow has a circle-like shape, and it appears on a mammography as low-density shadow having density variation in a Gaussian distribution. Based on such characteristic density variation, at the first detection, for example, as disclosed in JP-Tokukaihei-08-263461A, an intensity component and a direction component regarding density gradient from a part around a pixel of interest to the pixel of interest are calculated as features with the use of the Iris filter, and a candidate region is determined based on the features.

At the second detection, various types of features regarding the candidate region are calculated, such as a contrast, a standard deviation, a mean density value, a curvature, a fractal dimension, a circularity, an area and the like. Then, whether the identified candidate region is true positive abnormal shadow or not is judged by comparing the feature to a threshold for a mass shadow detection, the threshold being set in advance with respect to each feature. If the candidate region is judged as true positive abnormal shadow, this candidate region is outputted as a conclusive-detection result of a mass shadow candidate.

Next, a method for detecting a clustered-microcalcification shadow candidate will be described.

Figure 2:
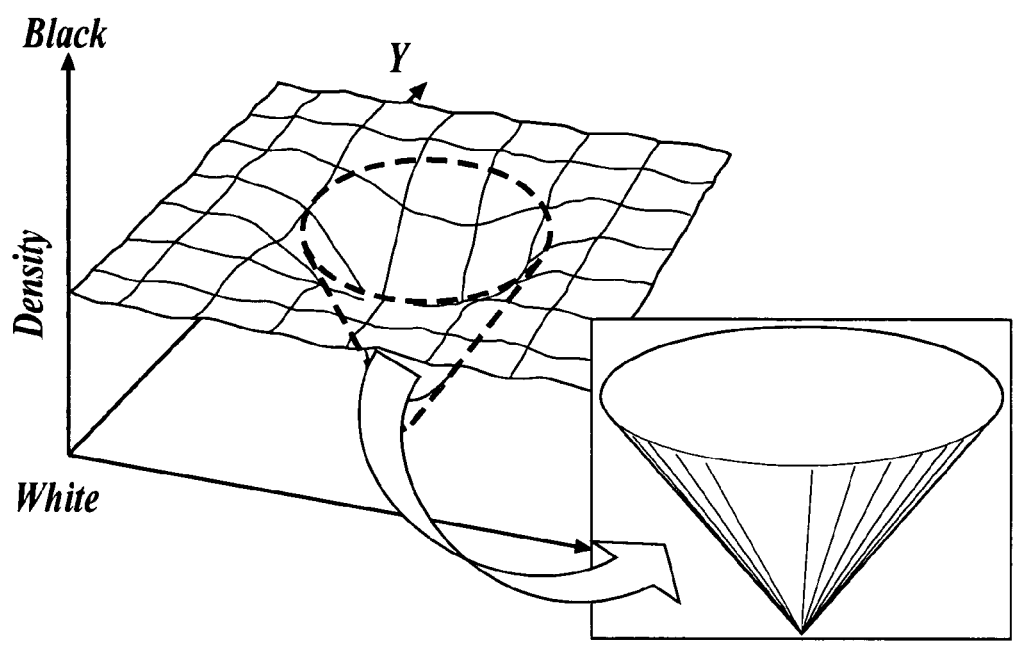
FIG. 2 is a view showing a curved surface shape of density variation of a clustered-microcalcification.
Figure 3:
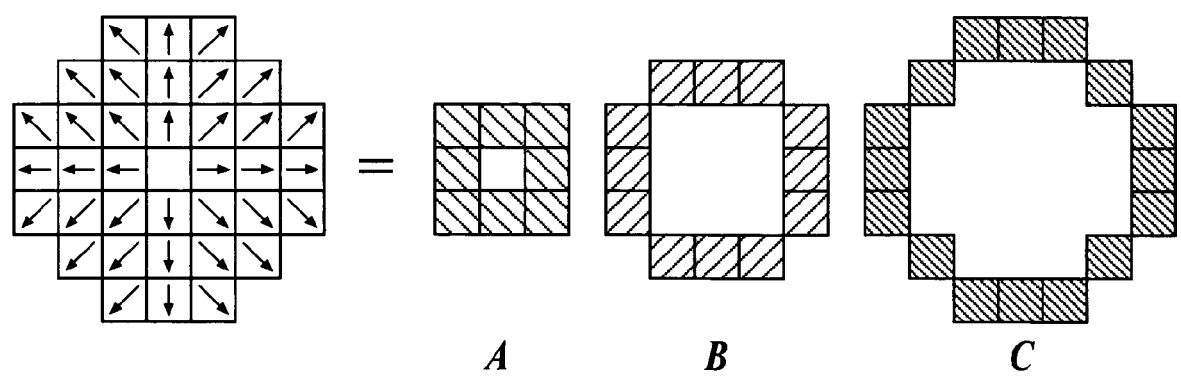
FIG. 3 is a view showing triple ring filters used for detecting a clustered-microcalcification candidate.

As shown in FIG. 2, clustered-microcalcification shadow appears on a mammography as shadow which gathers (clusters) low-density microcalcification parts having density distribution in approximately a conic structure. At the first detection, a candidate region is identified with the use of a filter for detecting a microcalcification part which is in approximately a conic structure, such as a triple ring filter having a vector pattern shown in FIG. 3.

The triple ring filter comprises three ring filters A, B and C in which an intensity component and a direction component regarding density gradient are in advance determined according to the case that the density variation shows an ideal conic shape. First, around a certain pixel of interest, an intensity component and a direction component regarding density gradient are calculated from pixel values on each area of the ring filters A, B and C with the use of the Sobel filter.

Hereafter, a way of calculating an intensity component and a direction component regarding density gradient according to the Sobel filter will be described. First, $\Delta xf(i,j)$ and $\Delta yf(i,j)$, which are the differentials in x direction and y direction in regard to a certain pixel of interest (i,j), are calculated by the following equations (1) and (2):

$$\Delta xf(i,j) = f(i+1,j)/2 + f(i+1,j) + f(i+1,j+1)/2 - \{f(i-1, j-1)/2 + f(i-1,j) + f(i-1,j+1)/2\} \quad (1)$$

$$\Delta yf(i,j) = f(i+1,j)/2 + f(i+1,j) + f(i+1,j+1)/2 - \{f(i-1, j-1)/2 + f(i-1,j) + f(i-1,j+1)/2\} \quad (2)$$

Then, an intensity component M of the density gradient vector and a direction component θ with respect to the pixel of interest (i,j) are calculated from $\Delta xf(i,j)$ and $\Delta yf(i,j)$ by the following equations (3) and (4):

$$M = \{\Delta xf(i,j)\}^2 + \{\Delta yf(i,j)\}^2 \quad (3)$$

$$\theta = \tan^{-1} \frac{\Delta yf(i,j)}{\Delta xf(i,j)} \quad (4)$$

In this way, after an intensity component and a direction component regarding density gradient in a region of each of the ring filters A, B and C are calculated, an index value indicating differences between the calculated values and a predetermined value of an intensity component and a direction component regarding density gradient which are set with respect to each of the ring filters A, B and C are calculated. Then, based on the index value, a candidate region is identified.

After a candidate region is identified, at the second detection, various types of features such as a contrast, a standard deviation, a mean density value, a curvature, a circularity, an area and the like are further calculated, and by comparing each calculated feature to a predetermined threshold provided for detecting a clustered-microcalcification shadow part which is set with respect to each feature, whether the identified candidate region is true positive abnormal shadow or not is judged according to the comparison result. In particular, among these features, a curvature is an index value indicating a curved surface shape of density variation. For example, while the curvature of a clustered-microcalcification shows a conic shape having a certain size with comparatively smooth gradient, the curvature of noise shows a conic shape having a narrow range with steep gradient. Therefore, for the classification between a clustered-microcalcification part and a noise component, a curvature is calculated while a mask size around the center of a candidate region is changed, in order to estimate a regional curved surface shape. Thereby, it is easier to do the classification between a true positive clustered-microcalcification part and a false positive noise component.

Then, if a candidate region is judged true positive based on each feature, this candidate region is detected as a candidate region of a clustered-microcalcification part. At last, if candidate regions of clustered-microcalcification parts detected at the second detection exist together within a predetermined area, the entire area is detected as a candidate region of clustered-microcalcification shadow.

Here, the above-described detection method is one example. Therefore, of course, it is possible to apply other known detection methods, such as a method using the morphology filter, the Laplacian filter or the like, to the present invention.

Further, the CPU 11 develops a detection correcting process program (see FIG. 4) according to the present invention stored in the program memory 18 into the RAM 16, and executes a detection correcting process by controlling each part of the medical image processing apparatus 10 in conjunction with the program.

In the detection correcting program, according to the abnormal shadow candidate detecting program as above-described, at first, a detection of a mass shadow candidate is performed in a mammography. Then, if a mass shadow candidate is detected, a detection condition for a clustered-microcalcification shadow candidate is changed. Then, in the mammography in which the detection of a mass shadow candidate has been completed, a clustered-microcalcification shadow candidate is to be detected for correcting a detection result by applying the changed detection condition to the mass shadow candidate region, and by applying the unchanged detection condition to the other image region.

In other words, with the combination of the abnormal shadow candidate detecting program and the CPU 11, it is possible to realize the abnormal shadow candidate detecting section. Further, with the combination of the detecting correction processing program and the CPU 11, it is possible to realize the correcting section.

The I/F 12 is an interface for establishing a connection to an image generating apparatus G, and inputs a medical image generated by the image generating apparatus G to the medical image processing apparatus 10.

As the image generating apparatus G, it is possible to apply a laser digitizer which reads a medical image signal by scanning laser beam over a film in which the medical image is recorded, a film scanner which reads a medical image signal recorded in a film by a sensor comprising photoelectric transducers such as CCD (Charge Coupled Device), and the like.

Further, a method for inputting a medical image is not limited to reading a medical image recorded in a film. For example, the following structures may be used: An image generating apparatus is connected to the image processing apparatus 10, the image generating apparatus generating a medical image with the use of photostimulable phosphor, or a flat panel detector is connected to the image processing apparatus 10, the flat panel detector comprising condensers and radiation detecting devices which generate electric charge corresponding to intensity of irradiated radiation.

The operating unit 13 comprises a keyboard having cursor keys, numeric keys and various types of function keys, and outputs an operation signal corresponding to a pushed key to the CPU 11. Here, according to necessity, the operating unit 13 may comprise a pointing device such as a mouse, a touch panel or the like.

The displaying unit 14 is the displaying section comprising an LCD (Liquid Crystal Display) or the like, and displays various types of display information such as a medical image, a detection result of an abnormal shadow candidate by the CPU 11, or the like.

The communicating unit 15 comprises a communications interface such as a network interface card, a modem, a terminal adaptor or the like, and transmits/receives various types of information to/from an external device on a communication network. For example, image data of a medical image may be received from the image generating apparatus G through the communicating unit 15, or by establishing a connection to a server or the like within a hospital or a diagnosis terminal placed in each examination room, a detection result of an abnormal shadow candidate may be transmitted through the communicating unit 15.

The RAM 16 forms a work area for temporarily storing various types of programs to be executed by the CPU 11, data processed by these programs, and the like.

The ROM 17 comprises a feature file 171, and stores data of a feature which is calculated by the CPU 11 when an abnormal shadow candidate is to be detected, in the feature file 171. Further, the ROM 17 stores image data groups of medical images to be a processing target, and also stores various types of information necessary for detecting an abnormal shadow candidate, such as threshold data for an abnormal shadow detection which is set with respect to each feature, and the like.

The program memory 18 stores a system program, an abnormal shadow candidate detecting program corresponding to each type of abnormal shadow, a detection correcting process program, data processed by each program, and the like.

Next, an operation of the present embodiment will be described.

In the following description, what will be described is an example of detecting a mass shadow candidate and a clustered-microcalcification shadow candidate in a mammography. However, a type of a medical image, a region to be generated (radiographed), a type of abnormal shadow to be a detection target are not limited to the following description.

Figure 4:
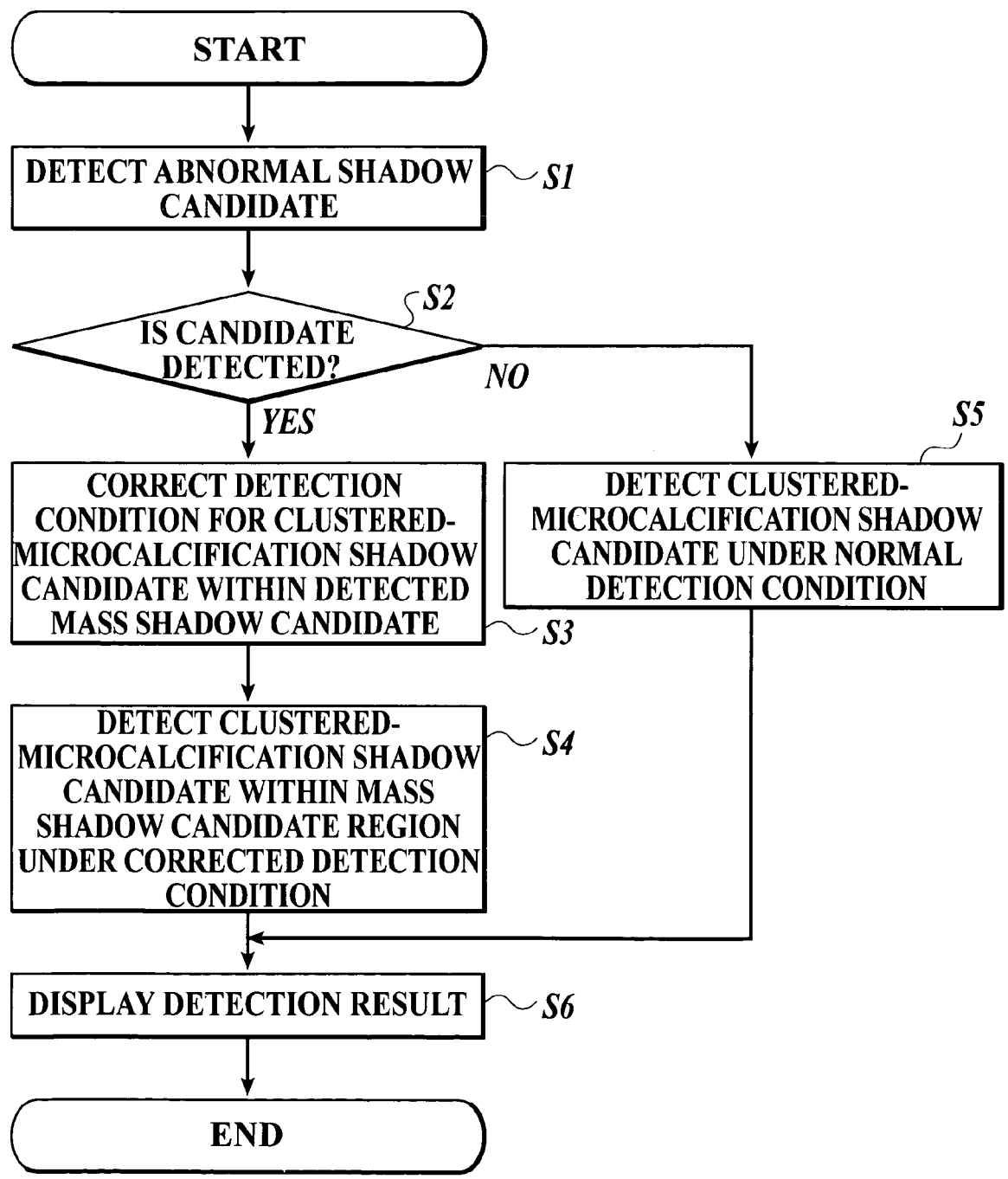
FIG. 4 is a flowchart showing detection correction processing performed by the medical image processing apparatus.

FIG. 4 is a flowchart illustrating a detection correcting process performed by the medical image processing apparatus 10.

In the detection correcting process shown in FIG. 4, at first, when image data of a mammography is inputted from the image generating apparatus G through the I/F 12, the CPU 11 performs the detection of a mass shadow candidate in the mammography according to a detection program for a mass shadow (Step S1). When the detecting process is completed, whether a mass shadow candidate is detected or not is judged (Step S2).

If a mass shadow candidate is detected (Step S2: YES), a detection condition for a clustered-microcalcification shadow candidate in the detected mass shadow candidate region is changed to be a detection condition for the mass shadow candidate region, that is, a detection condition under which it is possible to detect a clustered-microcalcification shadow candidate even within a mass shadow candidate region (Step S3). Concretely, if clustered-microcalcification shadow exists within mass shadow, due to its low contrast, it is estimated that it is difficult to detect the clustered-microcalcification shadow. Therefore, a detection condition regarding a contrast is mainly changed, for example, by changing a threshold with respect to a feature of a contrast so as to make it easier to detect the shadow, or by changing a threshold with respect to a feature of an intensity component regarding density gradient calculated according to the Sobel filter, or the like. Further, since it is estimated that the amount of reached X rays decreases and the noise component increases in the low density region, a condition for doing the classification between true positive clustered-microcalcification shadow and false positive noise components may be changed to be stricter so as to do the classification strictly.

Here, the correction of the detection condition may be done in the following way: While the detection condition for a mass shadow candidate region is stored in the ROM 16 in advance, if a mass shadow candidate is detected, the detection condition for a mass shadow candidate region is read out from the ROM 16, or alternatively, at each time that a mass shadow candidate is detected, a correction of the detection condition is made according to a feature of the detected mass shadow candidate.

Further, at this time, correcting amount of a detection result may be adjusted by having a correcting degree adjustable in a detection condition for a clustered-microcalcification shadow candidate, according to a feature of the detected mass shadow candidate. For example, if a mean density value which is one of the features of a mass shadow candidate is extremely low, since this is a situation where it is very difficult to detect a clustered-microcalcification shadow candidate, the correcting degree of a detection condition is adjusted so as to increase the detection rate, for example, by lowering the threshold of a contrast at two levels instead of lowering it at one level which is in a normal case. Thereby, it is possible to correct a detection result in more detail, and therefore the detection accuracy improves.

If a detection condition is changed, the CPU 11 does the image analysis on a mammography according to a detection program for clustered-microcalcification shadow, and calculates various types of features. Then, within an image region except for the mass shadow candidate region, the detection is performed under a normal detection condition, that is, the detection is performed by applying an unchanged detection condition to such region. Further, in the mass shadow candidate region, the detection is performed by applying the detection condition changed in Step S3 to the mass shadow candidate region (Step S4).

Concretely, in an image region except for the mass shadow candidate region, each calculated feature is compared to a predetermined threshold. Meanwhile, in the mass shadow candidate region, each calculated feature is compared to a changed threshold corresponding to each feature. Based on the comparison result, a clustered-microcalcification shadow candidate region is to be detected. Then, when the detection of a clustered-microcalcification shadow candidate is completed, the operation goes to a process of Step S6.

On the contrary, if a mass shadow candidate is not detected (Step S2; NO), the change of a detection condition is not done. Then, the image analysis is performed on a mammography, various types of features necessary for detecting clustered-microcalcification shadow are calculated, and clustered-microcalcification shadow is to be detected under a normal detection condition (Step S5). In other words, the calculated features are compared to predetermined thresholds which are set with respect to each feature, and a clustered-microcalcification shadow candidate region is detected based on its comparison result. When the detection of a clustered-microcalcification shadow candidate is completed, the operation goes to a process of Step S6.

In Step S6, the detection result of an abnormal shadow candidate is displayed together with the mammography on the displaying unit 14. Then, the process is completed.

Figure 5A:
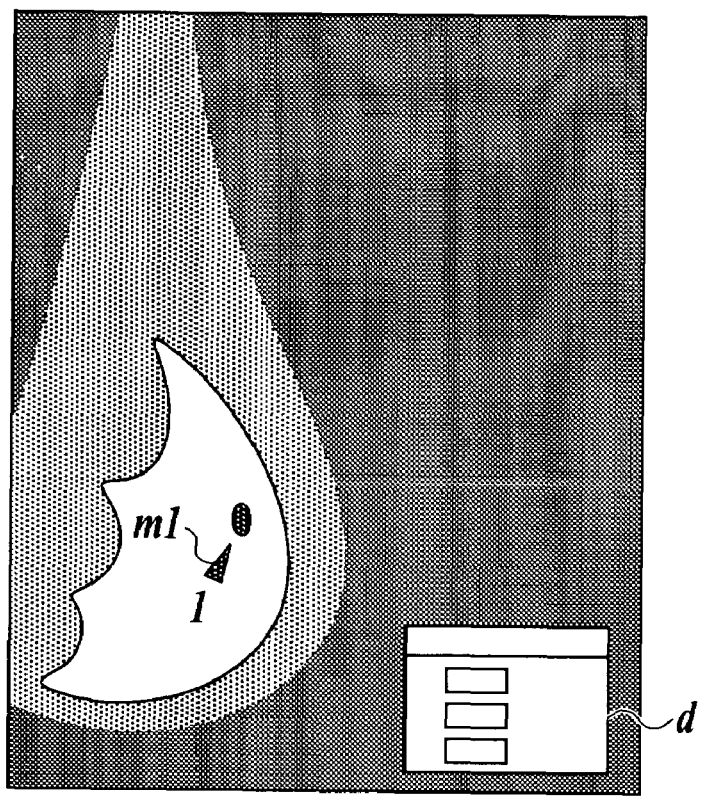
FIG. 5A is a view showing one example where only a detection result of a mass shadow candidate is displayed.
Figure 5B:
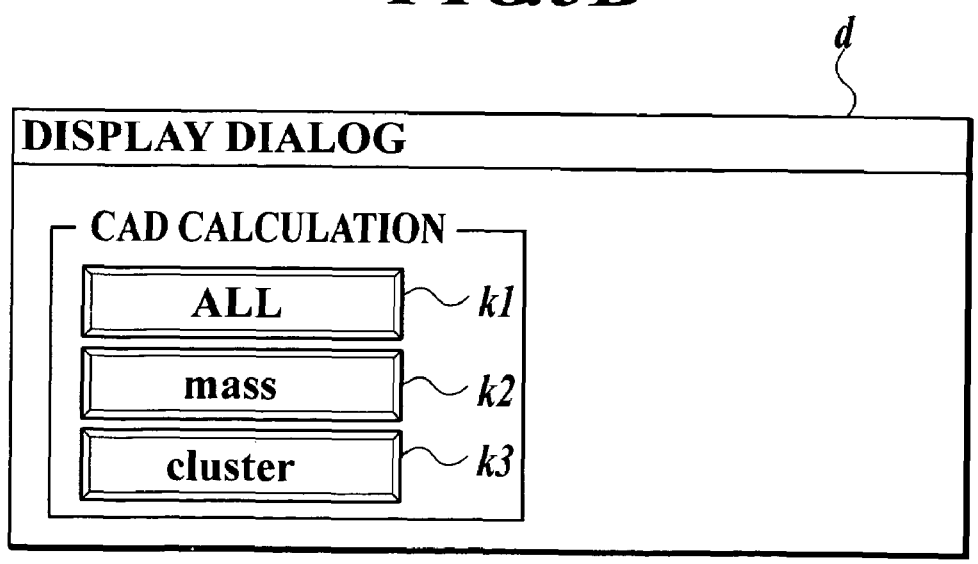
FIG. 5B is a magnified view showing a display dialog which is displayed when a display mode of a detection result is to be switched.

FIGS. 5A and 5B show display examples of the detection result.

FIG. 5A is a view showing a result screen on which only a detection result of a mass shadow candidate is displayed. On the result screen, what are displayed are not only a mammography but a mass shadow candidate detected in the mammography as a detection result of an abnormal shadow candidate with a marker m1, shown as a triangle, pointed at the mass shadow candidate. Further, a display dialog d is displayed so as to avoid overlapping the display dialog d and the mamma image, which is a subject.

FIG. 5B is a view showing a magnified view of the display dialog d.

As shown in FIG. 5B, on the display dialog d, displayed are various types of keys k1 to k3 for switching a display mode of the detection result of an abnormal shadow candidate. An ALL key k1 is a key for giving an instruction to display a detection result of both a mass shadow candidate and a clustered-microcalcification shadow candidate. Further, a mass key k2 is a key for giving an instruction to display a detection result of only a mass shadow candidate, and a cluster key k3 is a key for giving an instruction to display a detection result of only a clustered-microcalcification shadow candidate.

Figure 6A:
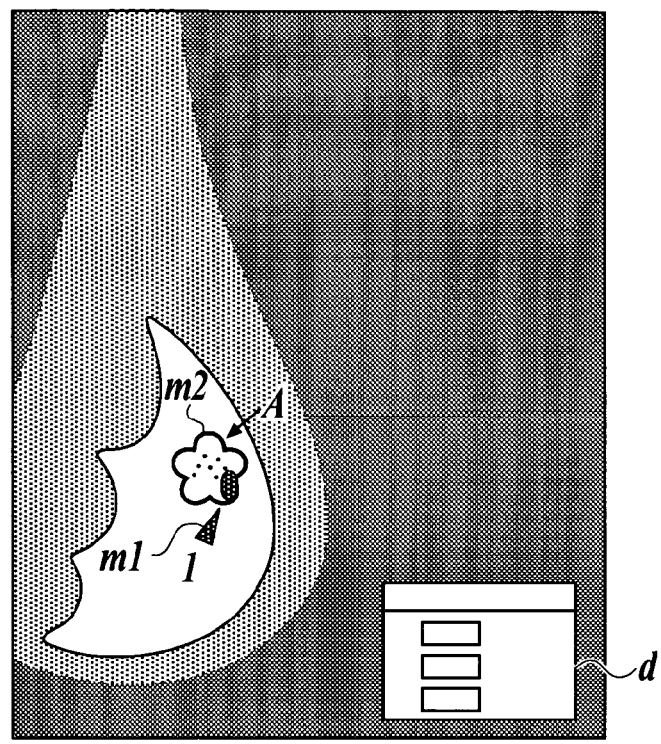
FIG. 6A is a view showing one example where a detection result of both a mass shadow candidate and a clustered-microcalcification shadow candidate is displayed.
Figure 6B:
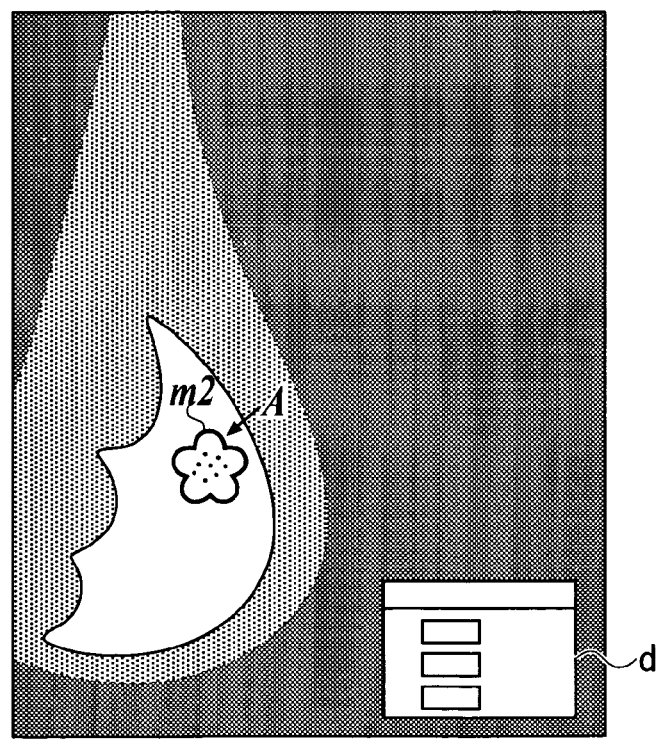
FIG. 6B is a view showing one example where only a detection result of a clustered-microcalcification shadow candidate is displayed.

If the ALL key k1 is pushed through the operating unit 13, as shown in FIG. 6A, a triangle marker m1 which is pointed at a mass shadow candidate region is displayed as a detection result of a mass shadow candidate, and a frame m2 which surrounds a clustered-microcalcification shadow candidate region is displayed as a detection result of a clustered-microcalcification shadow candidate. Further, if the mass key k2 is pushed, as shown in FIG. 5A, a detection result of only a mass shadow candidate is displayed, and if the cluster key k3 is pushed, as shown in FIG. 6B, a detection result of only a clustered-microcalcification shadow candidate is displayed.

In this way, according to the present embodiment, when a mass shadow candidate is detected, a detection condition for a clustered-microcalcification shadow candidate within the mass shadow candidate region is changed based on the detection result. Then, the detection is performed under the changed detection condition. Therefore, if clustered-microcalcification shadow exists within a mass shadow candidate region, it is possible to perform the detection under a detection condition corresponding to the mass shadow candidate region. Accordingly, even if different types of abnormal shadow are overlapped, it is possible to perform the detection under an appropriate detection condition. Consequently, it is possible to improve the detection accuracy of an abnormal shadow candidate.

Further, it is possible to switch the display of a detection result of an abnormal shadow candidate among a way of displaying only each different type of abnormal shadow and a way of displaying different types of abnormal shadow together. Concretely, it is possible to switch among a way of displaying the detection result of only a mass shadow candidate, a way of displaying the detection result of only a clustered-microcalcification shadow candidate, and a way of displaying the detection result of both a mass shadow candidate and a clustered-microcalcification shadow candidate. Therefore, it is possible to improve the diagnosis efficiency.

Here, the described content in the present embodiment is one example of the medical image processing apparatus 10 to which the present invention is applied, and the present invention is not limited to the content.

For example, in the above, described is the example that, under the assumption that clustered-microcalcification shadow exists within mass shadow, a detection result is corrected by changing a detection condition for a clustered-microcalcification shadow candidate based on a detection result of a mass shadow candidate. However, vice versa, a detection condition for a mass shadow candidate may be changed based on a detection result of a clustered-microcalcification shadow candidate. In this case, since clustered-microcalcification shadow, which is distributed in a dotted fashion, exists within mass shadow, the detection rate is made higher, for example, by changing a threshold with respect to a feature of a standard deviation, which indicates a degree of roughness within a candidate region, and if a degree of roughness reaches a certain extent, the candidate region is detected as a shadow candidate.

Further, in the above, described is the example that a detection condition for a clustered-microcalcification shadow candidate is changed based on a detection result of a mass shadow candidate, and a clustered-microcalcification shadow candidate is detected under the changed detection condition. However, the present invention is not limited to the example. The present invention may be applied to the following case: A detection regarding both a mass shadow candidate and a clustered-microcalcification shadow candidate is once performed, and if a mass shadow candidate is detected, the detection of a clustered-microcalcification shadow candidate is re-performed only within the detected mass shadow candidate region under a changed detection condition for a clustered-microcalcification shadow candidate, and similarly, if a clustered-microcalcification shadow candidate is detected, the detection of a mass shadow candidate is re-performed within only the detected clustered-microcalcification shadow candidate region under a changed detection condition for a mass shadow candidate.

Figure 7:
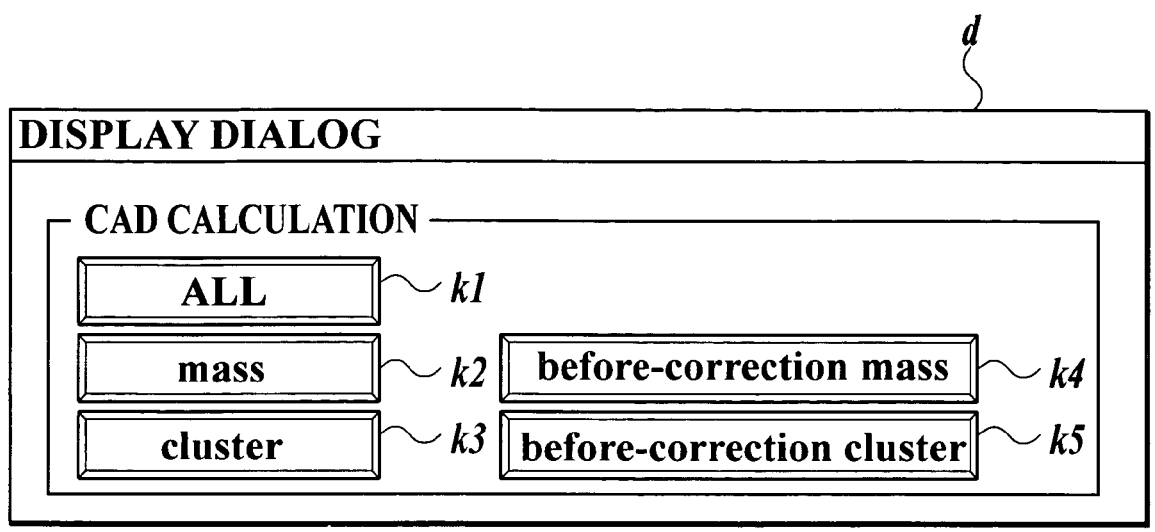
FIG. 7 is a view showing one example of the display dialog comprising a before-correction mass key and a before-correction cluster key for giving an instruction to display a detection result under an uncorrected detection condition, that is, before the detection condition is corrected.
Figure 8:
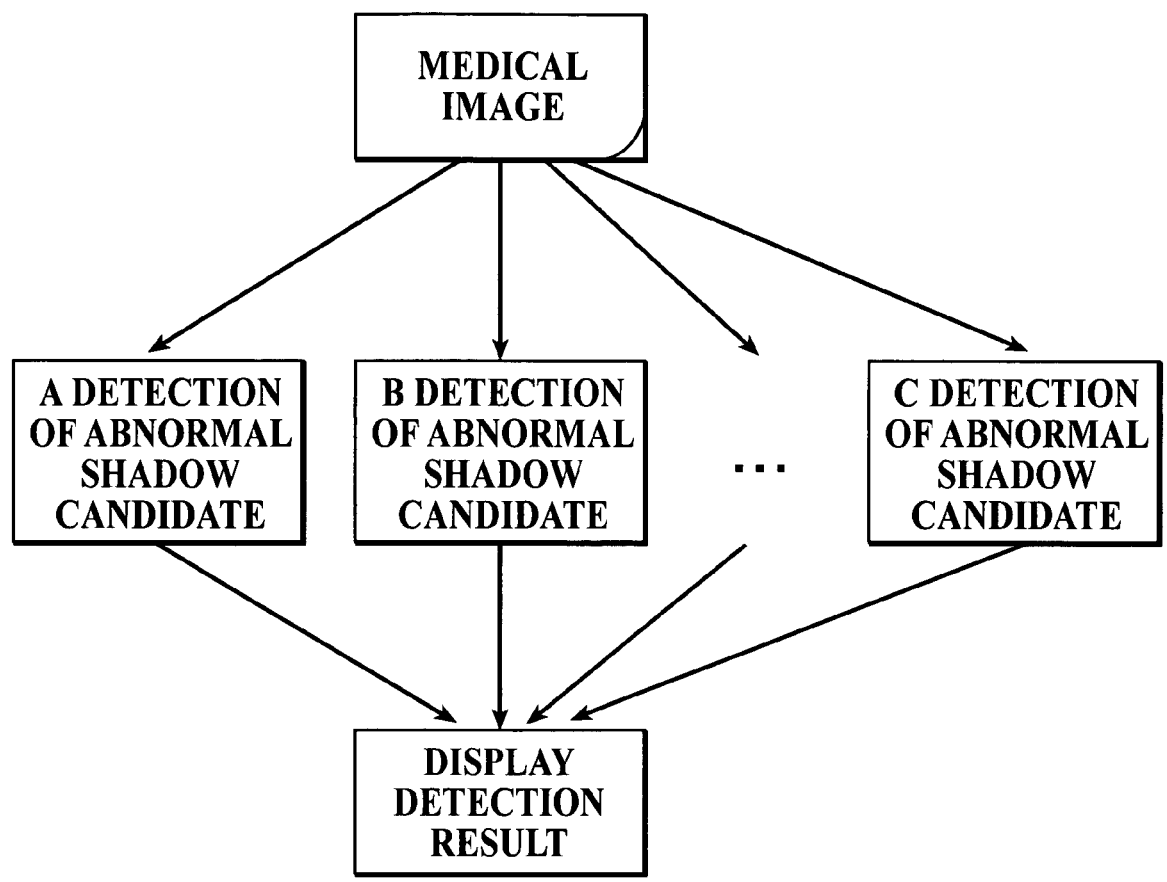
FIG. 8 is a view showing a flow of an abnormal shadow candidate detection in earlier arts.

In this case, it is also possible to obtain a detection result before a detection condition is changed, that is, a detection result before the correction. Therefore, when a detection result of an abnormal shadow candidate is displayed, as shown in FIG. 7, in the display dialog d, in addition to the ALL key k1, the mass key k2 and the cluster key k3, a before-correction mass key k4 for giving an instruction to display a detection result of only a mass shadow candidate before a detection condition is changed, and a before-correction cluster key k5 for giving an instruction to display a detection result of only a clustered-microcalcification shadow candidate before a detection condition is changed may be provided so as to provide a display mode under which it is possible to switch the display between a detection result before the correction and a detection result after the correction.

And so forth, the detailed structure and the detailed operations of the medical image processing apparatus 10 according to the present embodiment may be suitably changed without departing the gist of the present invention.

The entire disclosure of Japanese Patent Application No. Tokugan 2003-335521 filed on Sep. 6, 2003, including specifications, claims, drawings and summaries are incorporated herein by reference in their entirety.

What is claimed is:

1. A medical image processing apparatus comprising:
   an abnormal shadow candidate detecting section for detecting a plurality of types of abnormal shadow candidates in a medical image; and
   a correcting section for correcting a detection result of one type of abnormal shadow candidate by the abnormal shadow candidate detecting section based on a detection result of another type of abnormal shadow candidate,
   wherein the correcting section corrects a detection condition for the one type of abnormal shadow candidate based on the detection result of the another type of abnormal shadow candidate, and
   the abnormal shadow candidate detecting section performs a detection of the one type of abnormal shadow candidate in an image region in which the another type of abnormal shadow candidate is detected, by applying the detection condition corrected by the correcting section,
   wherein the medical image comprises a mammography, the abnormal shadow candidate detecting section detects a mass shadow candidate and a clustered-microcalcification shadow candidate in the mammography, the correcting section corrects a detection condition for the clustered-microcalcification shadow candidate based on a detection result of the mass shadow candidate by the abnormal shadow candidate detecting section, and the normal shadow candidate detecting section detects the clustered-microcalcification shadow candidate in an image region of the mass shadow candidate by applying the clustered-microcalcification shadow candidate detection condition corrected by the correcting section.

2. The apparatus of claim 1, wherein the abnormal shadow candidate detecting section calculates each type of feature value by performing image analysis on the medical image, and detects the abnormal shadow candidate based on the feature value, and the correcting section adjusts correcting amount regarding the detection result of the one type of abnormal shadow candidate in accordance with the feature value of the another type of abnormal shadow candidate, which is calculated by the abnormal shadow candidate detecting section.

3. The apparatus of claim 1, further comprising a displaying section for displaying the detection result of at least one of the plurality of types of abnormal shadow candidates by the abnormal shadow candidate detecting section.

4. The apparatus of claim 3, wherein the display section displays the detection result so that a display of the detection result corrected by the correcting section and a display of the detection result which is not yet corrected by the correcting section are switchable.

* * * * *